United States Patent
Steinmaier et al.

(10) Patent No.: US 7,953,712 B2
(45) Date of Patent: May 31, 2011

(54) COMPUTER SYSTEM, A DATABASE FOR STORING ELECTRONIC DATA AND A METHOD TO OPERATE A DATABASE SYSTEM

(75) Inventors: Carola Steinmaier, Schnesheriueostr (DE); Marcus Pfeifer, Heidelberg (DE); Bernard Brinkmöller, Wiesloch (DE)

(73) Assignee: SAP AG, Walldorf (DE)

( * ) Notice: Subject to any disclaimer, the term of this patent is extended or adjusted under 35 U.S.C. 154(b) by 1005 days.

(21) Appl. No.: 11/064,002

(22) Filed: Feb. 24, 2005

(65) Prior Publication Data

US 2005/0193042 A1  Sep. 1, 2005

(30) Foreign Application Priority Data

Feb. 24, 2004 (EP) .................................... 04004155

(51) Int. Cl.
*G06F 17/30* (2006.01)
(52) U.S. Cl. ....................... 707/694; 707/695
(58) Field of Classification Search .................. 707/694, 707/695
See application file for complete search history.

(56) References Cited

U.S. PATENT DOCUMENTS

| | | | |
|---|---|---|---|
| 5,142,620 A | 8/1992 | Watanabe et al. | |
| 6,088,694 A | 7/2000 | Narang et al. | |
| 6,161,107 A | 12/2000 | Stern | |
| 6,223,343 B1 * | 4/2001 | Hopwood et al. | 717/101 |
| 6,289,460 B1 * | 9/2001 | Hajmiragha | 726/28 |
| 6,564,215 B1 | 5/2003 | Narang et al. | |
| 7,107,284 B1 * | 9/2006 | Betz et al. | 707/104.1 |
| 7,127,461 B1 * | 10/2006 | Zhu et al. | 707/9 |
| 7,383,263 B2 * | 6/2008 | Goger | 707/9 |
| 7,536,423 B2 * | 5/2009 | Brinkmoeller et al. | 1/1 |
| 2003/0018644 A1 * | 1/2003 | Bala et al. | 707/100 |
| 2004/0083231 A1 * | 4/2004 | Boros et al. | 707/104.1 |
| 2005/0086596 A1 * | 4/2005 | Koch et al. | 715/526 |
| 2008/0028300 A1 * | 1/2008 | Krieger et al. | 715/255 |

FOREIGN PATENT DOCUMENTS

WO    WO 99/23584 A2    5/1999

OTHER PUBLICATIONS

Herbst, A., "Long-term Database Support for Express Data," Scientific and Statistical Database Management, 1994. Proceedings, Seventh International Working Conference on Charlottesville, VA, USA Sep. 28-30, 1994, Los Alamitos, CA, USA, IEEE Comput. Soc, Sep. 28, 1994, pp. 207-216.
European Search Report for Application No. EP 04 00 4156.
Silberberg, D., "Ingest-A Simple Program for Performing Distributed Relational Database Operations," Software Practice & Experience, John Wiley & Sons, Ltd., Chichester, GB, vol. 22, No. 6, Feb. 1, 1992, pp. 455-466.
Schaarschmidt R. et al., "Datenbankbasiertes Archiveieren im SAP System R/3," Wirtschaftsinfomatik, Vieweg Verlagsgesellschaft, braunschweig, DE, vol. 39, No. 5, 1997, pp. 469-477.
United States PTO Office Action dated May 3, 2007, for U.S. Appl. No. 11/064,469.

* cited by examiner

*Primary Examiner* — Hosain T Alam
*Assistant Examiner* — Johnese Johnson
(74) *Attorney, Agent, or Firm* — Finnegan, Henderson, Farabow, Garrett & Dunner, LLP

(57) ABSTRACT

A computer system includes a database containing a plurality of data documents stored thereon, each data document containing at least one data field, and an archive system for electronically archiving data documents originating from the database. The database includes a control table stored thereon containing change rule information pertaining to the at least one data field of a data document archived in the archive system.

12 Claims, 4 Drawing Sheets

COMPUTER SYSTEM, A DATABASE FOR STORING ELECTRONIC DATA AND A METHOD TO OPERATE A DATABASE SYSTEM

TECHNICAL FIELD

The present invention relates generally to the field of electronic data processing, and more particularly to a computer system, a database for storing electronic data and a method to operate a database system.

RELATED APPLICATIONS

Priority is claimed to European Patent Application No. 04 004 155.0, filed Feb. 24, 2004, the content of which is incorporated herein by reference.

BACKGROUND

Today, data is almost entirely processed electronically by means of large computer systems. Particularly in the field of operating a business, a large amount of data covering all aspects of a business, particularly in the context with customers, orders, billing, machine or device data etc., accumulate over time. In order not to overload the database of the computer system, there is usually the wish to delete data that is not needed anymore, e.g. data concerning a finished business activity or process. However, very often there exists a legal requirement to keep such data over a given time period, which can be five years and even longer. As a solution hereto, software developers created so-called archive systems in which all kind of data and data documents can be archived once they are not needed in the database anymore. However, there is the drawback that archived data cannot be changed or altered anymore as the archive system usually is a read-only medium. Therefore, users tend to keep even data which could be archived in the regular productive database because they want to be able to perform certain changes as there are cases in which it is desirable to alter archived data. This leads to a situation in which data archiving is not performed as soon as it should (or could) be done, in order to ensure system performance and to keep the database size at a reasonable and preferably constant level.

The only possibility to change archived data today is to reload such data into the database, perform necessary changes and archiving the data again after it has been changed. This results in a very high administrative and time wise effort and is a potential source of error.

SUMMARY

Consistent with embodiments of the present invention, a database stores a plurality of data documents and is interconnected with archive systems for electronically archiving data documents originating from the database. The database comprises a control table containing change rule information pertaining to the at least one data field of a data document archived in the archive system. Upon retrieving and opening a data document which is archived in an archive system, change rule information pertaining to the retrieved archive data document is retrieved from a database interconnected with the archive system and displayed together with the retrieved archived data document.

It is to be understood that in the context of this invention, the term "data document" defines any entity of structured data comprising at least one data field and the term "archive system" defines a read-only medium on which data documents originating from a database are archived, the data to be archived being initially written on the read-only medium. Further, the term "control table" relates to a computer-implemented control element which operates on the basis of a table or matrix.

An archived data document may thus be retrieved together with control information defining which of the data fields contained in the retrieved data document can be subject to an alteration. The change rule information stored in the database automatically sets the data fields that can be subject to an alteration in a change mode once the data document is retrieved from the archive system and displayed on the monitor of a user. The remaining data fields which cannot be subject to an alteration remain in their non-change mode. This enables a user to easily effect changes to an archived data document.

In an embodiment, any alteration to a data field which can be subject to an alteration is stored separately in the database, e.g. in a log element. This allows a detailed history of all changes effected to a given data document to be kept and ensures that changes are correctly displayed upon a later retrieval of a changed data document.

The invention also covers a computer program with program coding means which are suitable for carrying out a process according to the invention as described above when the computer program is run on a computer. The computer program itself as well as stored on a computer-readable medium is claimed.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

The invention is schematically illustrated in the drawings by means of an embodiment by way of example and is hereinafter explained in detail with reference to the drawings. It is understood that the description is in no way limiting on the scope of the present invention and is merely an illustration of a preferred embodiment of the invention.

DETAILED DESCRIPTION

Reference will now be made in detail to the present embodiments of the invention, an example of which is illustrated in the accompanying drawings. Wherever possible, the same reference numbers will be used throughout the drawings to refer to the same or like parts.

Figure 1:
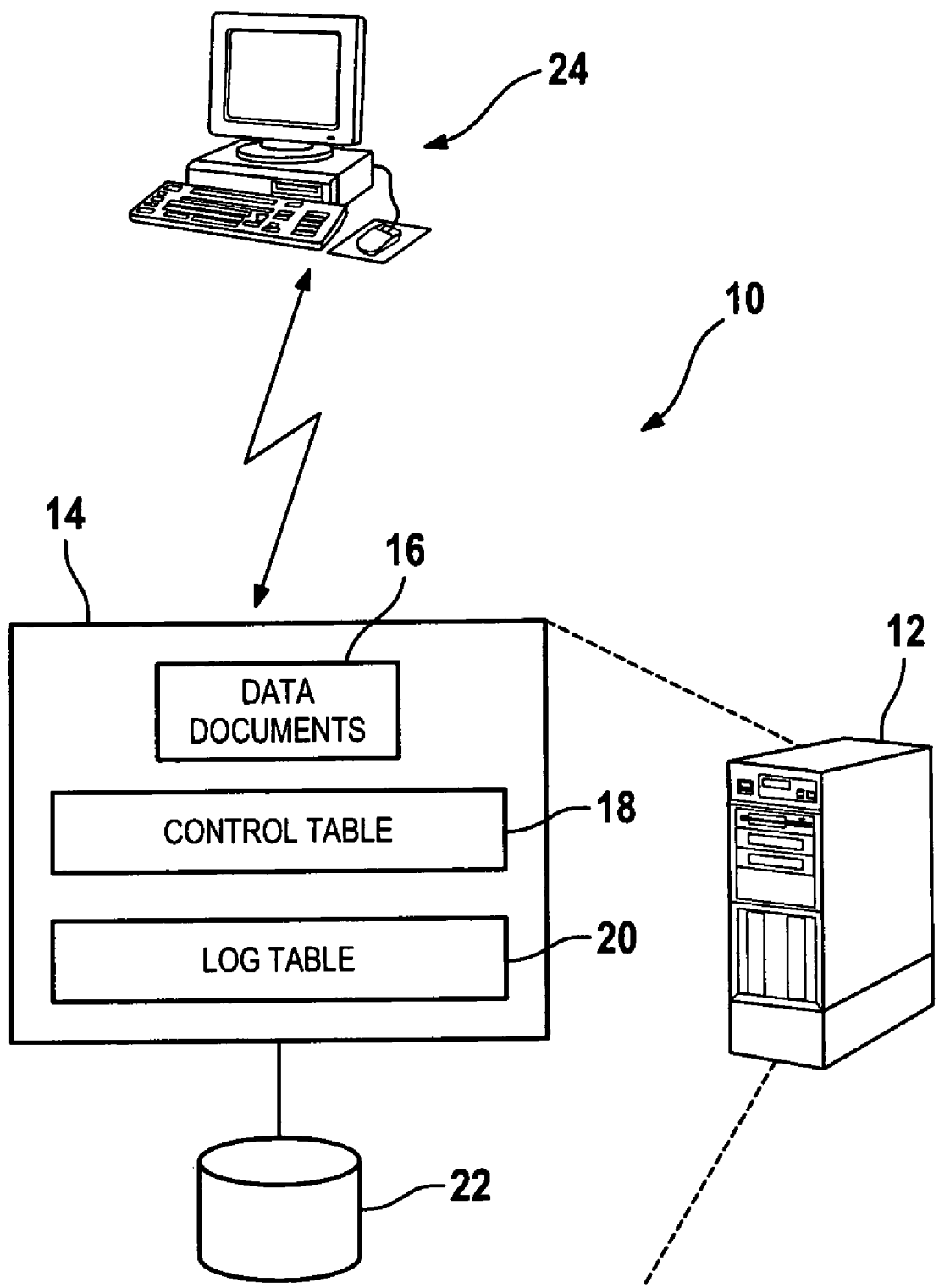
FIG. 1 is a schematic block diagram of a computer system consistent with the invention.

The invention is illustrated by means of one possible embodiment in which a computer system 10 comprises a client computer 24 and a database system 12 (cf. FIG. 1). The database system 12 comprises a database 14 and an archive system 22, the latter being interconnected with the database 14. A plurality of data documents 16 is stored on the database 14. As already explained above, data documents which are not needed on database 14 anymore can be archived in the archive system 22. Thus, the archive system serves as an off-load for the database. The archive system 22 typically is a read-only medium.

As already mentioned above, there are numerous situations in which a user might experience the need to perform changes or alterations to a data document which is already archived. According to the invention, such alterations are made possible by change rule information pertaining to the data documents archived in the archive system.

Exemplary embodiment are now described in more detail with reference to FIGS. 2 to 4.

Figure 2:
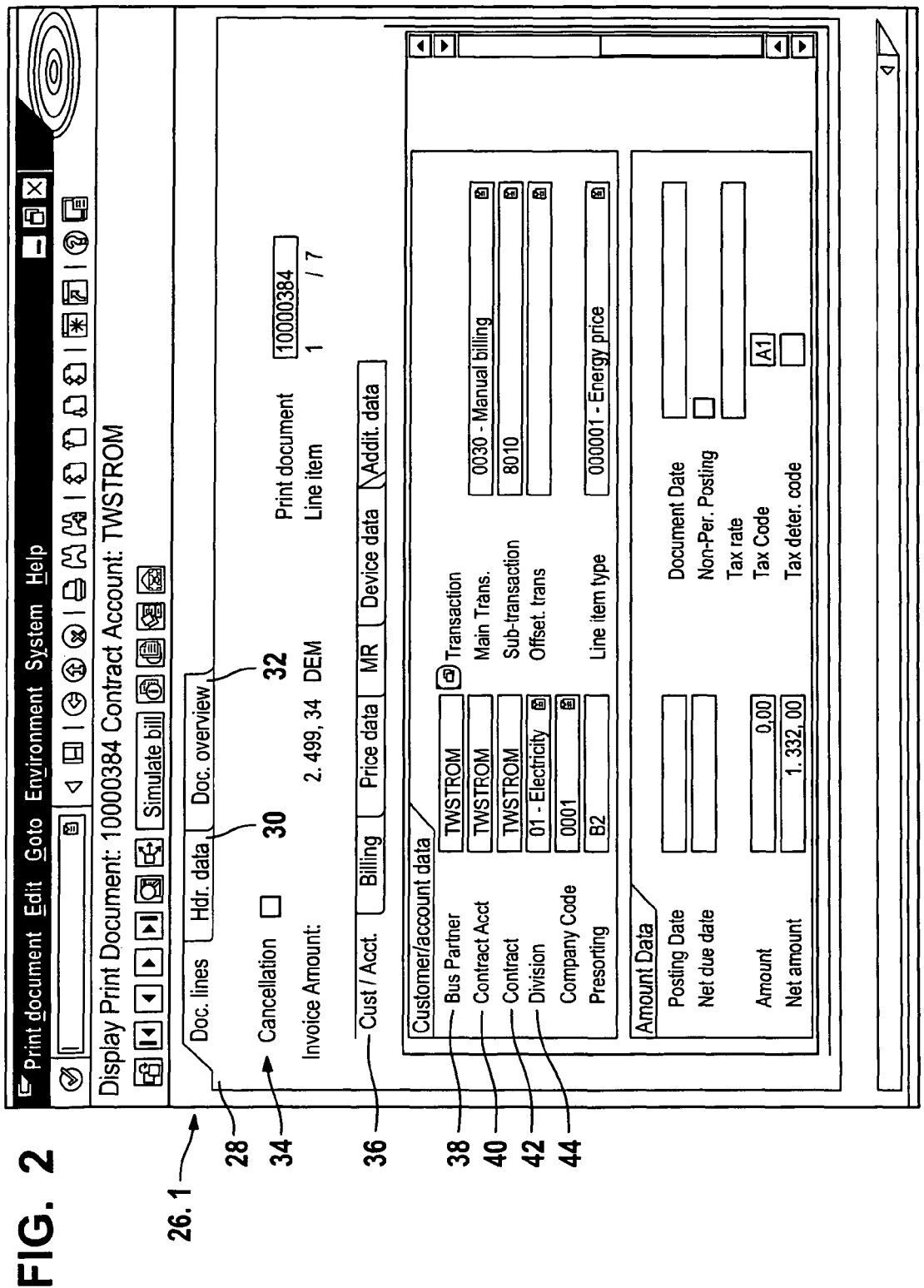
FIG. 2 illustrates a data document archived in a database system according to the invention.
Figure 3:
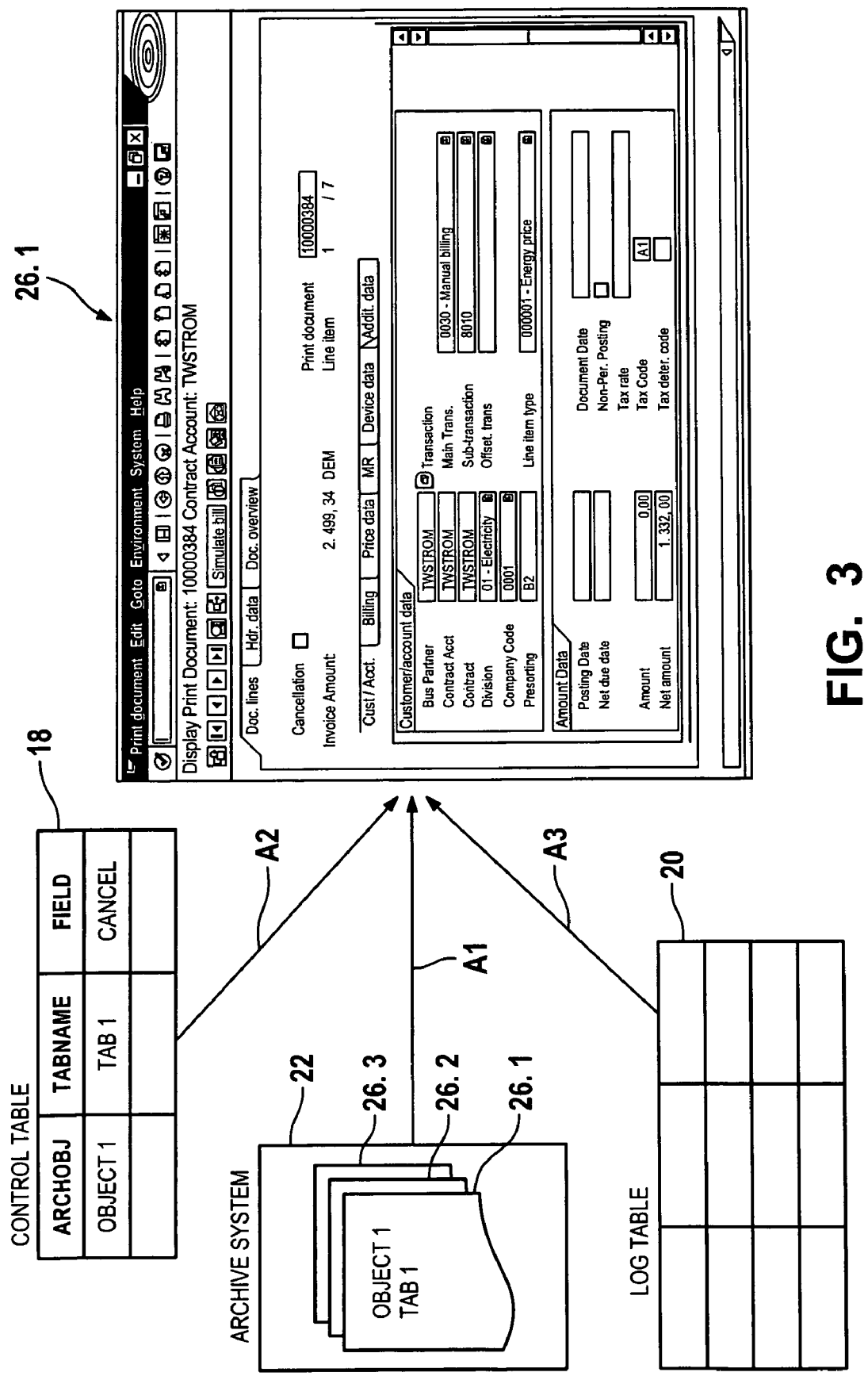
FIG. 3 is a schematic block diagram illustrating retrieval and display of the archived data document shown in FIG. 2.

FIG. 2 shows a data document 26.1 which is archived in the archive system 22 (cf. also FIG. 3). The data document 26.1 comprises a plurality of data fields which are distributed on different tabs. In the illustration of FIG. 2, a tab 28 with the header "Doc lines" is shown, further tabs of the shown data document 26.1 having the headers "Hdr data" (30) and "Doc. overview" (32).

A data document 26.1 is a structured data document with a plurality of data fields. When archiving the data document 26.1 in the archive system 22, the structure of the data document 26.1 is retained unchanged. That means that the archived data document 26.1 has exactly the same structure as it can be seen on the display when the data document 26.1 is loaded from the archive system 22. The exact knowledge of the structure and the arrangement of the data document 26.1 makes it possible to adapt thereto a control equipment as for example a log table and a control table as it is described in more detail with reference to FIGS. 3 and 4.

On the tab "Doc lines" 28, various data fields are displayed, such as the data field 34 "cancellation" and, on sub-tab 36 "Cust/Acct" data fields 38 "BusPartner", 40 "Contract Acct", 42 "Contract", 44 "Division" etc.

Upon retrieval of the data document 26.1 from the archive system 22, a control table 18 is loaded from the database 14. The control table 18 contains change rule information pertaining to the various data fields of the data documents 26.1, 26.2, 26.3, . . . archived in the archive system 22. For example in the embodiment illustrated in FIG. 3, the control table 18 comprises information that identifies a given archive object (which in the example shown in FIG. 3 is object 1 identical with the shown data document 26.1) and a table name (which in the example is "tab 1") to identify the data field.

Further, the control table 18 contains information regarding given data fields which can be subject to a change or alteration after the according data document has already been archived. In the example shown in FIG. 3, data field "cancel" is identified in the third column "field" of control table 18. This means that data field 34 "cancellation" of tab 1 of object 1 (=data document 26.1) can be subject to a change. None of the other data fields 38, 40, 42, 44, . . . is identified in the control table and thus cannot be subject to any changes or alterations.

Arrows A1 and A2 in FIG. 3 illustrate that the data document 26.1 from the archive system and the control table 18 from the database 14 are retrieved together and processed for display on the client 24. Client 24 is interconnected with the database 14 by means of appropriate elements which are well known to the person skilled in the art, e.g. appropriate hardware and software such as a processing unit and/or server and interfaces.

Processing of the retrieved data document 26.1 and the control table 18 for display on the client computer 24 comprises an evaluation of the change rule information of the control table and a merging of the obtained information with the data document 26.1 to be displayed by appropriate evaluation and merger means. The display can be effected in such a manner that every data field of the data document 26.1 which can be subject to a change is shown in an active status (e.g. underlaid in white as shown in FIG. 2 for active data field 34) or in a non-active status (e.g. underlaid in grey as shown for non-active data fields 38, 40, 42, 44 in FIG. 2).

Figure 4:
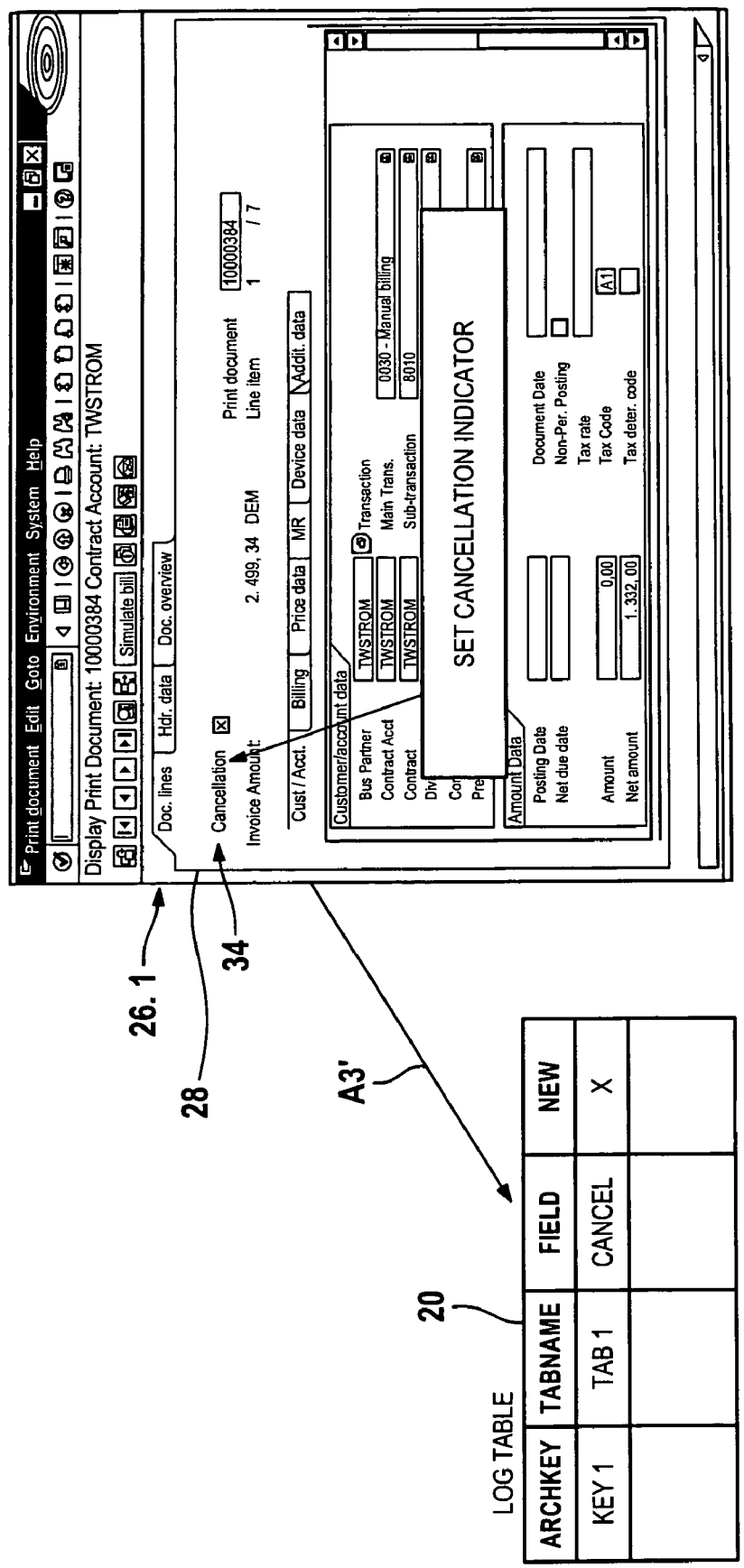
FIG. 4 illustrates how changes to the archived data document of FIG. 3 are saved in a log table consistent with the invention.

In case a change or alteration to a data field which can be subject to a change is performed (such as illustrated in FIG. 4 for the data field 34 in which the cancellation indicator is set with an "x"), the change is stored according to the invention in the log table 20 as indicated by arrow A3 in FIG. 4.

The log table 20 comprises information which allows the identification of a given data field (data field 34 in the example illustrated in FIGS. 2 to 4) according to the information contained in the control table 18 plus the additional information pertaining to the new content of this data field after the alteration.

In the example shown in FIG. 4, the log table 20 therefore comprises in its fourth column bearing the header "new" the indication "x" for the new content of the cancellation data field 34. The indication of the new content of the changed data field is related to an archive key (first column of the log table 20) which serves to identify the given data document containing the changed data field.

It has to be noted that the changes which have been affected to any data field in the data document 26.1 are not archived together with the data document 26.1 in the archive system 22, but separately as appropriate entries within the log table 20. Whenever the data document 26.1 is loaded from the archive system 22 the log table 20 is also loaded from the database together with the changes which have been made to the data document 26.1 in the past. The content of the log table 20 is merged with the data document 26.1 in such a way that the change last effected to the data document 26.1 is appropriately displayed at the data field which has been concerned by that change. The data document 26.1 is, however, always archived in its original state without any changes. The changes are simultaneously stored within the log table 20 which can always be loaded from the database whenever the data document 26.1 is retrieved from the archive system 22.

As can also be seen in FIG. 3, the information contained in the log table 20 is also evaluated and merged with the information drawn from the data document 26.1 and the control table 18 (arrow A3). In the depiction of FIG. 3, the log table is still void and thus has no effect on the display of the archived data document 26.1. However, once there was a change to any data field in the data document 26.1 (as the change of the cancellation data field 34 described above with reference to FIG. 4), in a subsequent retrieval and display of the archived data document after the change has been effected, the content of the log table 20 in the example of FIG. 4 the entry "x") would be considered and the change to the data field would be displayed.

The control table according to the invention is a class-oriented table (as to the data objects or documents concerned), and the log table according to the invention is a document-specific table.

The invention therefore provides a system and a method to process archived data without actually changing the archived data documents so that the original state of the data document is reproducible at any time. The control table according to the invention allows for a maximum of customization. It also provides for a high level of security as all changes are stored in the log table.

What is claimed is:

1. A computer system comprising:
   a read-only archive system;
   a database, wherein the read-only archive system electronically archives data documents originating from said database, the database storing at least:
   a plurality of data documents stored thereon, each data document containing at least one data field;
   a control table stored thereon containing change rule information pertaining to the at least one data field of a data document archived in an archive system, and
   a log table that stores changes to content of archived data documents in the archive system;
   a processor communicatively coupled to the database and the read-only archive system that executes at least:
   deleting a first data document from the database and storing the first data document in the read-only archive system;
   accessing the control table in the database to determine whether the data field of the first data document can be modified;
   updating, if the data field of the first data document can be modified, the log table of the database to reflect new content of the data field of the first data document;
   receiving a request to return the first data document, and, in response:
   retrieving the first data document from the archive system;
   retrieving the new content from the database; and
   returning the first data document with the new content in place of the original content of the data field; and
   a client interconnected with said database and set up to retrieve any of the plurality of data documents from said database and retrieve an archive data document, wherein the fields of said retrieved archive data document are displayed active or non-active to change in response to said change rule information.

2. A computer-readable storage medium having stored thereon instructions that, when executed by a processor, causes the processor to perform steps comprising:
   access a read-only archive system;
   access a database that stores electronic data including:
   a plurality of data documents, each data document containing at least one data field;
   a control table containing change rule information pertaining to the at least one data field of a data document archived in an archive system; and
   a log table storing changes to content of the archived data documents of the archive system;
   transfer a first data document from the database to the read-only archive system;
   delete the first data document from the database;
   determine whether a first data field of the first data document in the archive system can be modified by accessing the change rule information in the control table in the database;
   modify, if the modification is allowed, the first data field by storing the new content in the log table of the database;
   receive a request to retrieve the first data document, and, in response:
   retrieve the first data document from the archive system;
   retrieve the new content from the log table of the database, the database being arranged to be interconnected with a client, said client being set up to retrieve one of the plurality of data documents from said database and to display a retrieved archive data document, wherein data fields of said retrieved archive data document are displayed active or non-active to change in accordance with said change rule information; and
   return the first data document with the new content of the first data field.

3. A method to operate a database system, said database system comprising a database containing a plurality of data documents stored thereon, each data document containing at least one data field, the method comprising:
   providing a read-only archive system that electronically archives data documents originating from said database;
   providing a log table in the database that stores any alteration to said at least one data field of the archived data documents;
   deleting a first data document from the database and storing the first data document in the read-only archive system;
   upon retrieving and opening the first data document archived in said archive system, retrieving from said database change rule information pertaining to said retrieved archived data document;
   displaying the change rule information together with said retrieved archived data document and the alteration, wherein said change rule information displayed together with said retrieved archived data document indicates which of said at least one data field of said displayed data document can be altered;
   receiving a request to modify a first data field of the first data document archived in the archive system;
   determining whether the check rule information allows the modification;
   modifying, if the check rule information allows, the content of the first data field by storing new content in the log table of the database;
   receiving a request to access the first data document archived in the archive system, and, in response:
   retrieving the first data document from the archive system;
   retrieving the new content from the log table of the database system; and
   returning the first data document with the new content of the first data field.

4. A method of changing archived data documents, comprising:
   retrieving, via a processor, an archived data document from a read-only archive system that electronically archives documents originating from a database;
   retrieving, via a processor, change rule information pertaining to at least one data field of said retrieved archive data document;
   displaying said retrieved archive data document with any data field identified in said change rule information as being alterable set active for change, all remaining data fields set non-active;
   storing, via a processor, any change to said active data field in a log table within the database;
   receiving, via a processor, a request to access the archived data document, and, in response:
   retrieving the archived data document from the archive system;
   retrieving the new content from the log table of the database system; and returning the first data document with the new content of the first data field;

retrieving the change from the log table from said database; and displaying said retrieved archived data document with the content of any data field listed in said log table being the content identified in said log table for said data field and with any data field identified in said change rule information as being alterable set active for change, all remaining data fields set non-active.

5. The computer system of claim 1, wherein the changes to content stored by the log table include multiple different changes to content of a single archived data document.

6. The computer system of claim 1, wherein the log table comprises information that allows the identification of the data field of the first data document.

7. The computer readable storage medium of claim 2, wherein the changes to content stored by the log table include multiple different changes to content of a single archived data document.

8. The computer readable storage medium of claim 2, wherein the log table comprises information that allows the identification of the first data field.

9. The method of claim 3, further comprising storing, via the processor, multiple changes to said active data field in the log table within the database.

10. The method of claim 3, wherein storing new content in the log table of the database includes storing the information such that the data field of the first data document can be identified.

11. The method of claim 4, further comprising storing, via the processor, multiple changes to said active data field in the log table within the database.

12. The method of claim 4, wherein storing new content in the log table of the database includes storing the information such that the data field of the first data document can be identified.

\* \* \* \* \*